Patented July 24, 1928.

1,678,105

UNITED STATES PATENT OFFICE

COURTNEY CONOVER, OF CRAFTON, PENNSYLVANIA, ASSIGNOR TO THE SELDEN COMPANY, OF PITTSBURGH, PENNSYLVANIA.

PLASTIC COMPOSITION.

No Drawing.  Application filed September 4, 1923.  Serial No. 660,933.

The invention relates to improved forms of resinous plastic compositions of the type containing an ester of a polyhydric alcohol and a polybasic acid.

Resinous plastic compositions made by the combination of a polyhydric alcohol, such as glycerol and a polybasic acid, such as phthalic acid are well-known and have many valuable properties. They are fusible when first prepared, but may be converted into an infusible form by heat alone. However, the fusible form is in general too viscous to be poured easily or to have good penetrating properties. Also the time required to convert the fusible to the infusible form at temperatures below 200° C. is so great as to limit the usefulness of these compositions in many cases.

I have found that by the addition of furfural in certain proportions to resinous plastic compositions consisting mainly of glycerol phthalates, products may be obtained which can be rendered infusible by heating for a shorter time or at a lower temperature than is necessary for a similar composition containing no furfural. These compositions containing furfural can be prepared in forms which when fused are mobile enough to be poured easily and to penetrate fibrous materials. They are useful for impregnating coils and for other purposes in electrical engineering, for impregnating wood and other fibrous materials, for enameling metal, for the preparation of various cements, various waterproof and oil-proof materials, for molding purposes, and the like.

A composition within the scope of the present invention and suitable for impregnating fibrous materials may be prepared as follows:

Ninety-two parts of glycerol and 148 parts of phthalic anhydride are heated together. The temperature is allowed to rise slowly to 210° C., and is held at about that point for about one hour more or less, till tests of the batch show the product to be brittle and only slightly sticky when cold. The temperature is then lowered to about 140° C. and 48 parts of furfural are added to the batch. The mixture is stirred till homogeneous.

The product is a mobile, dark colored liquid at 130° C. Since the boiling point of furfural is about 162° C., the composition cannot be heated much above that temperature under ordinary pressure. The time required to convert it to an infusible form by heating at 160° will depend to a great extent upon the stage of resinification of the batch before the addition of the furfural. In many cases a batch prepared as above will solidify or gelatinize in one-tenth the time required for a similar batch to which no furfural has been added. With similar proportion of materials a batch with furfural solidified in one and one-half hours as against about fifteen hours without furfural.

Compositions which may be solidified more readily than the product described above, but which are not so fluid when fused, may be prepared by using increased proportions of phthalic anhydride and decreased proportions of furfural in relation to the proportion of glycerol.

The following examples give approximate proportions of successful compositions:

1. 92 parts glycerin—148 parts phthalic anhydride—30 parts furfural.
2. 92 parts glycerin—184 parts phthalic anhydride—48 parts furfural.
3. 92 parts glycerin—184 parts phthalic anhydride—30 parts furfural.

Minor changes from the above quantities do not affect the product.

Other organic substances containing a plurality of alcoholic hydroxyl groups such for example, glycol, propylene glycol, butylene glycol, or diglycerol, may be substituted wholly or in part for the glycerol in the compositions described; other dicarboxy acids such as succinic, maleic and fumaric acids may be substituted wholly, and monocarboxy acids such as butyric, and propionic acids in part, for the phthalic anhydride; homologues and equivalents of furfural, for example: Methyl furfural, phenylmethyl furfural, furfur-acetone, furfur-acrolein, dimethyl furfural, may be substituted for it.

Condensation products of acetone, and other substances having a carbonyl group linked to a carbon atom having a double bond are considered the equivalents of furfural. For example condensation products obtained by the action of hydrochloric acid on acetone have, in some cases, given results like those obtained by the use of furfural. In some other cases, they gave inconsistent results. These compounds were of unknown composition but were presumably unsaturated ketones resembling furfural in having a carbonyl group linked to a carbon atom having a double bond.

Softening agents such as diethyl phthalate and castor oil, and fillers such as asbestos and wood flour, may be added to the compositions described without changing their fundamental character.

What I claim, is:—

1. A resinous plastic composition comprising the reaction product of glycerol, phthalic anhydride and furfural.

2. A composition comprising a resinous substance obtained by the reaction of approximately three parts glycerine, one part furfural, and five parts phthalic anhydride.

3. A resinous plastic composition made by heating together glycerol, phthalic anhydride, furfural and a softening agent.

4. In resinous plastic compositions made by the combination of a polyhydric alcohol and a polybasic acid, and which are fusible when first prepared but convertible into an infusible form by heat, the addition thereto of a non-acid forming compound having a carbonyl group linked to a carbon atom having a double bond, whereby products are obtained which can be rendered infusible, by heating for a shorter period of time than is necessary for a similar composition without the said added compound.

5. In resinous plastic compositions made by the combination of gycerol and phathalic anhydride and which are fusible when first prepared but convertible into an infusible form by heat alone, the addition thereto of a non-acid forming compound having a carbonyl group linked to a carbon atom having a double bond, whereby products are obtained which can be rendered infusible by heating for a shorter period of time than is necessary for a similar composition without the said added composition.

6. The addition of furfual to resinous plastic compositions consisting mainly of glycerol phthalates, whereby products are obtained which can be rendered infusible, by heating for a shorter period of time than is necessary for a similar composition containing no furfural.

7. The addition of a material selected from the group furfural methyl furfural, phenyl methyl furfural furfur acetone; furfur-acrolein, dimethyl furfural and condensation products of acetone having a carbonyl group linked to a carbon atom having a double bond to resinous plastic compositions made by the combination of a material selected from the groups, glycerol, propylene glycol, butylene glycol, diglycerol and a material selected from the groups phthalic succinic, maleic, fumaric, butyric and propionic and whereby products are obtained which can be rendered infusible, by heating for a shorter period of time than is necessary for a similar composition containing no furfural.

8. In resinous plastic compositions made by the combination of a polyhydric alcohol and a polybasic acid and which are fusible when first prepared but convertible into an infusible form by heat alone, the addition thereto of a material selected from the group comprising furfural, phenyl methyl furfural, furfur acetone, furfur acrolein, dimethyl furfural and condensation products of acetone having a carbonyl group linked to a carbon atom having a double bond, whereby products are obtained which can be rendered infusible, by heating for a shorter period of time, than is necessary for a similar composition, without the said added compound.

In testimony whereof, I affix my signature.

COURTNEY CONOVER.